United States Patent  (10) Patent No.: US 8,781,865 B2
Bivens et al.  (45) Date of Patent: Jul. 15, 2014

(54) HANDLING CONSOLIDATED TICKETS

(75) Inventors: John A. Bivens, Ossining, NY (US);
Valentina Salapura, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/570,977

(22) Filed: Aug. 9, 2012

(65) Prior Publication Data

US 2014/0039958 A1    Feb. 6, 2014

Related U.S. Application Data

(63) Continuation of application No. 13/566,326, filed on Aug. 3, 2012.

(51) Int. Cl.
*G06Q 10/00* (2012.01)
(52) U.S. Cl.
USPC ........................................ 705/7; 705/8; 705/9
(58) Field of Classification Search
USPC ..................................................... 705/7, 8, 9
See application file for complete search history.

(56) References Cited

U.S. PATENT DOCUMENTS

| | | | |
|---|---|---|---|
| 7,818,631 B1 * | 10/2010 | Halikhedkar et al. | 714/48 |
| 2004/0120250 A1 * | 6/2004 | Langevin et al. | 370/216 |
| 2007/0133755 A1 * | 6/2007 | Jean et al. | 379/1.01 |
| 2008/0195614 A1 * | 8/2008 | Lutz et al. | 707/7 |
| 2008/0263077 A1 * | 10/2008 | Boston | 707/102 |
| 2009/0007145 A1 * | 1/2009 | White et al. | 719/318 |
| 2010/0262446 A1 * | 10/2010 | Sticker | 705/7 |
| 2012/0259540 A1 * | 10/2012 | Kishore et al. | 701/410 |

* cited by examiner

*Primary Examiner* — Nga B. Nguyen
(74) *Attorney, Agent, or Firm* — Scully, Scott, Murphy & Presser, P.C.; Louis J. Percello, Esq.

(57) ABSTRACT

Handling problem tickets in a computing environment, in one aspect, may comprise identifying a plurality of tickets generated in the computing environment that are candidates for consolidation. The identifying may be done based on whether the tickets have the same or similar root cause, whether they are generated from virtual machines having same configuration, and/or one or more other criteria. The tickets which are candidates for consolidation may be grouped into a bundled group, and marked as bundled. Resolving a ticket from the bundled group may potentially resolves all tickets from the bundled group.

21 Claims, 5 Drawing Sheets

HANDLING CONSOLIDATED TICKETS

CROSS-REFERENCE TO RELATED APPLICATIONS

This application is a continuation of U.S. patent application Ser. No. 13/566,326 filed on Aug. 3, 2012, the entire contents of which are incorporated herein by reference.

FIELD

The present application relates generally to computers, and computer applications, and more particularly to handling problem tickets.

BACKGROUND

In computing systems and infrastructures, problem handling systems generate problem tickets, for instance, based on reports by users or automatically detected problems. The problem tickets are then sent to appropriate persons, for example to system administrators for resolution. Such persons or system administrators investigate the problem associated with the tickets and try to fix the problem or further forward to appropriate experts who may be able to address the problem. As is apparent, such procedures incur costs.

In information technology (IT) management, virtualization, virtual machines (VMs) and cloud computing are state of the art, partly because such virtual environment reduces cost through better resource utilization, standardization and simplified maintenance. Cloud or strategic outsourcing (SO) providers agree to guarantee a certain level of quality of service (QoS), for instance, per service level agreement (SLA).

In strategic outsourcing (SO) and cloud environment, problem tickets are opened for events causing problems, to be resolved by system administrators. However, as described above, problem resolution may induce cost. Hence, inventors in the present disclosure have recognized that there is a need to reduce the cost of handling problem tickets in a compute environment, e.g., while guaranteeing QoS as agreed with SLA.

BRIEF SUMMARY

A method of handling problem tickets in a computing environment, in one aspect, may comprise identifying a plurality of tickets generated in the computing environment that are candidates for consolidation into a bundled group. The method may also comprise marking the plurality of tickets as bundled. The method may further include selecting a representative ticket from the bundled plurality of tickets. The method may yet further comprise increasing a priority associated with the selected representative ticket. The method may also comprise decreasing one or more priorities respectively associated with one or more other tickets in the bundled group. The method may also comprise adding information associated with the consolidation to the plurality of tickets in the bundled group. The method may still further comprise entering the plurality of tickets into a ticketing system with the added information.

A method of handling problem tickets in a computing environment, in another aspect, may comprise identifying a plurality of tickets generated in the computing environment that are candidates for consolidation into a bundled group. The method may also comprise marking the plurality of tickets as bundle. The method may further comprise selecting a representative ticket from the bundled plurality of tickets. The method may also comprise increasing a priority associated with the selected representative ticket. The method may further comprise adding information associated with the consolidation to the representative ticket. The method may yet further comprise reducing the priority of one or more of other tickets in the bundled group if a total number of tickets in the computing environment having a defined low priority is below a threshold number. The method may still yet comprise adding information associated with the representative ticket to the one or more other tickets in the bundled group. The method may also comprise entering the plurality of tickets into a ticketing system with the added information.

A method of handling problem tickets in a computing environment, in yet another aspect, may comprise accessing an open ticket from a ticketing system handling the problem tickets. The method may also comprise resolving a problem associated with the open ticket. The method may further comprise determining whether the open ticket is marked as bundled. The method may yet further comprise, in response to determining that the open ticket is marked as bundled: accessing a bundled ticket from a group associated with the open ticket and evaluating a solution for the bundled ticket based on the resolution of the problem associated with the open ticket. The method may also comprise, in response to solving a problem associated with the bundled ticket, closing the bundled ticket, and in response to determining that the problem associated with the bundled ticket is not solved, restoring original priority associated with the bundled ticket and returning the bundled ticket to the ticketing system.

A system for handling problem tickets in a computing environment, in one aspect, may comprise a consolidation module operable to execute on a processor and identify a plurality of tickets generated in the computing environment that are candidates for consolidation into a bundled group. The consolidation module may be further operable to mark the plurality of tickets as bundled. A ticket handling manager module may be operable to select a representative ticket from the bundled plurality of tickets, increase a priority associated with the selected representative ticket, decrease one or more priorities respectively associated with one or more other tickets in the bundled group, and add information associated with the consolidation to the plurality of tickets in the bundled group.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
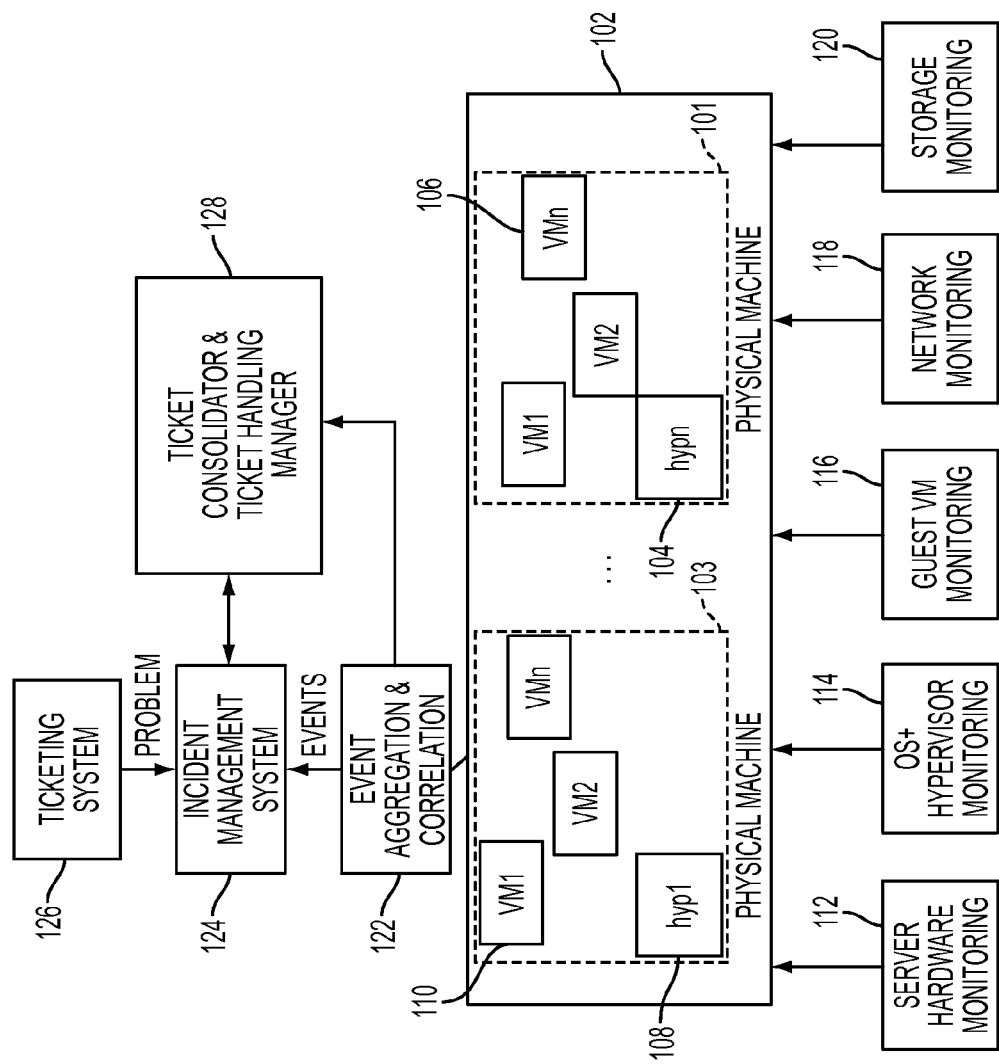
FIG. 1 is an architectural diagram illustrating ticket consolidation and managing in one embodiment of the present disclosure.

Problem tickets may be consolidated, for example, based on a criterion, to reduce the amount of work that a system administrator or the like need to perform. A ticket handling manager of the present disclosure in one embodiment may select a representative ticket from the consolidated group for resolution. FIG. 1 is an architectural diagram illustrating ticket consolidation and managing in one embodiment of the present disclosure. A computing environment 102 may include one or more physical machines, e.g., 101, 103. A physical machine 101 may run a hypervisor 104, which can have a plurality of virtual machines 106 running on the hypervisor 104. Similarly, a physical machine 103 may run a hypervisor 108, which can have a plurality of virtual machines 110 running on the hypervisor 108. Various monitoring modules may monitor a computing environment, e.g., 102. Monitoring modules may include, but are not limited to, a server hardware monitoring module 112, which for example, may monitor server hardware for performance, problems or any other events related to the computing environment's server hardware; an operating system/hypervisor monitoring module 114 that may monitor one or more operating systems and hypervisors; a guest VM monitoring module 116 that may monitor VMs; a network monitoring module 118 that may monitor network elements and traffic; and a storage monitoring module 120 that may monitor storage devices and related performance and traffic. Those various monitoring modules may look for problems, determine what is happening in the system with respect to the devices that the monitoring modules are monitoring, and may generate one or more events and/or logs related to their monitoring, e.g., if abnormal behavior is detected. Those monitoring modules may also automatically generate problem tickets.

Event aggregation and correlation module 122 may receive the events and/or logs from one or more monitoring modules (e.g., 112, 114, 116, 118, 120), identify problematic events and/or logs and send those events that are determined to be abnormal events, for instance, those that indicate behavior of the devices that might signal a problem to an incident management system 124. Similarly, a ticketing system module 126 may also generate one or more events or problem logs based on customer reports and send the one or more events to the incident management system 124. The incident management system 124 creates tickets associated with the events it received, and opens the tickets, for instance, to be handled by a system administrator or the like.

Ticket consolidator and Ticket handling manager 128 of the present disclosure in one embodiment may group the tickets and handle them. The ticket consolidator and handling manager 128 may analyze problem reports of the tickets, for example, may identify physical location of VMs and/or time of reporting the problem, and identify tickets that are caused by the same problem. The ticket consolidator and handling manager 128 may identify those tickets that have the same root cause, and that can be resolved by resolving that problem's root cause, and consolidates, or bundles, the identified tickets into a group. From a consolidation ticket group or bundle, the ticket consolidator and handling manager 128 may select one ticket as a representative of the group for expedited handling while placing the other tickets in the group in a lower priority group. Once the high priority ticket is resolved, all associated lower priority tickets from the same consolidation group can be verified that the problem is resolved, and closed. If the number of problem tickets in the same problem group exceeds sensitivity threshold, problem mitigation steps may be taken.

Figure 2:
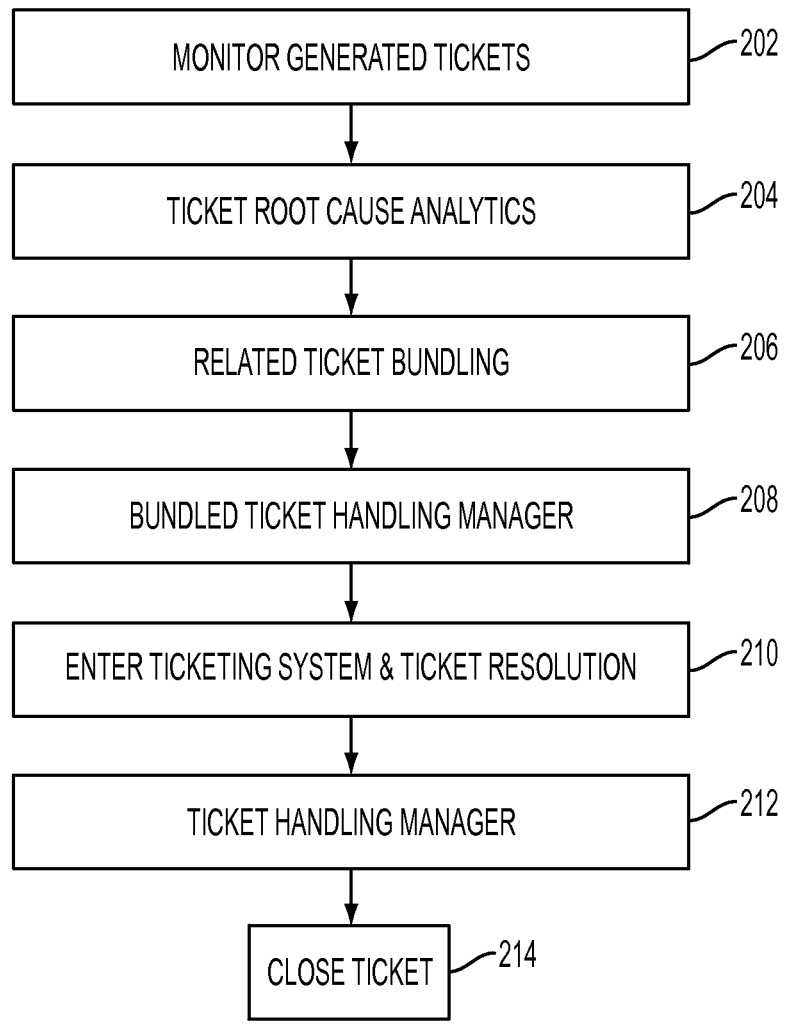
FIG. 2 is a flow diagram illustrating a method of handling tickets in one embodiment of the present disclosure.

FIG. 2 is a flow diagram illustrating a method of handling tickets in one embodiment of the present disclosure. At 202, problem tickets that are created are monitored. At 204, root cause analytics is performed to determine the root cause of the problem reported in a created ticket. At 206, related tickets are bundled or consolidated into a group. At 208, a ticket handling manager or the like module may manage, e.g., identify a representative ticket from the group of tickets, and may modify the priority of the tickets in the bundle. This is done in a way to increase the priority of the representative ticket, and to lower the priority of other tickets in that group. At 210, based on the management of the bundled tickets at 208, additional information related to those tickets may be entered into the ticketing system. At 212, a ticket handling is performed, e.g., the ticket selected as being the representative ticket may be resolved. At 214, the resolved ticket is closed, and the information associated with the closing of the resolved ticket is passed to other tickets in that group. Other tickets in the bundle may be closed after some (or none) verification is performed that the underlying problem is indeed resolved. In one embodiment, this verification is done automatically. In another embodiment, this verification is performed manually by a system administrator. In yet another embodiment, some combination of automatic or manual verification is performed. In still yet another embodiment, no verification need be performed that the cause of the problem is resolved before bundled tickets are closed.

Figure 3:
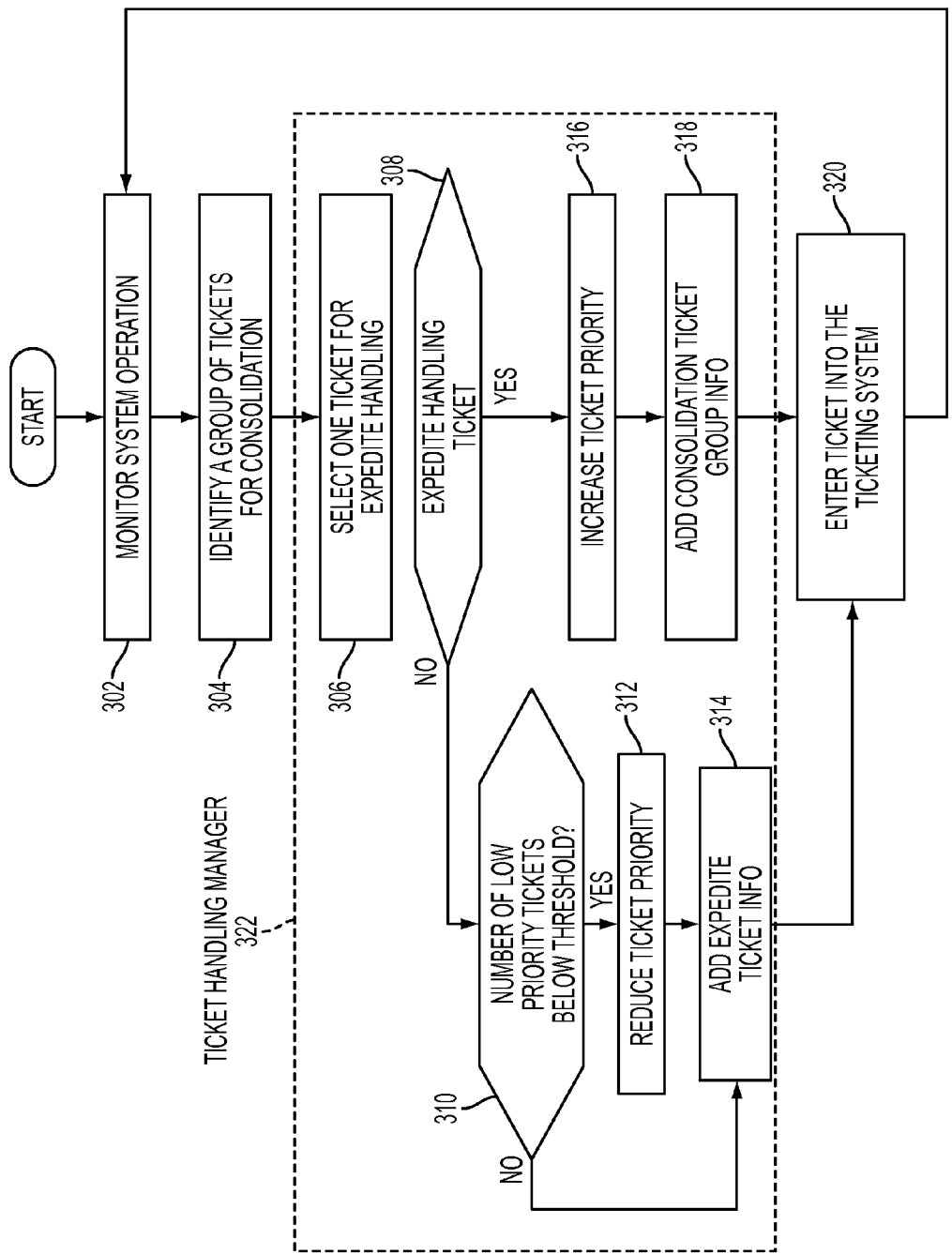
FIG. 3 is a flow diagram illustrating a method for processing and entering a ticket into a ticketing system in one embodiment of the present disclosure.

FIG. 3 is a flow diagram illustrating a method for processing and entering a ticket into a ticketing system in one embodiment of the present disclosure. At 302, system operations may be monitored and tickets created, e.g., by an incident management system or the like. At 304, tickets are analyzed, and a group of tickets that can be consolidated may be identified. For example, problem tickets that occur due to the same cause of problems may be consolidated; Multiple tickets with the same root cause, or with the new environment condition, could be consolidated into a single ticket. For instance, multiple VMs may report a problem caused by the same cause; VMs on the same server will all report the same physical failure; VMs with the same configuration can all encounter the same runtime error; VMs in the same network can all report the same network problem. Tickets generated from one or more virtual machines running on the same physical machine may be consolidated. Further, tickets generated from one or more virtual machines which run different tiers of a multi-tier application may be consolidated.

Yet other methods for identifying candidate tickets for consolidation may include, but are not limited to leveraging a common resource database. For example, Tivoli™ service automation manager (DB TSAM) holds information regarding which VMs are on which server. Tickets may be modeled and monitored so that it is possible to tell when some tickets always happen at the same time. Other methods for bundling could also be used.

As described above, ticket consolidator in one embodiment of the present disclosure identifies tickets which could be consolidated. Tickets identified for consolidation may be created and entered in the ticketing system (e.g., with updated information such as priority or resolution), or left as they are in the ticketing system for handling. In one embodiment of the present disclosure, the tickets identified for consolidation may be marked and handled differently from the non-marked tickets.

FIG. 3 reference items 306 to 318 (box 322) illustrate handling of those consolidated or marked tickets. A ticket handling manager module may perform the processing shown in 308 to 318 for each ticket in the consolidation group. At 306, a representative ticket is selected from the bundled or consolidated tickets for expedited handling. A representative ticket may be selected based on one or more criteria or factors. Several options are possible for selecting a representative ticket from the consolidated group. For example, a ticket may be randomly selected. As another example, the ticket with the oldest time stamp (the first one in the bundle) may be selected. As yet another example, correlation analysis may be performed on the group of tickets and a ticket with the most overlap or likeness to all tickets may be selected. Other methods for selecting a representative ticket may be employed.

At 308, it is determined whether the representative ticket is a candidate for expedited handling. Handling marked tickets that are consolidated may also include modifying the priority of marked tickets. For example, if at 308 it is determined that the selected ticket is a ticket to be representative and is selected for expedited handling, the priority of this ticket is increased at 316. This selected ticket is referred to as the expedite ticket for the sake of explanation in the present disclosure. The priority of the expedite ticket is set to high priority, e.g., higher than any in the same consolidation group. The priorities of the other tickets in the same consolidation group are set to lower priority, e.g., lower than that of the expedite ticket.

At 318, relevant information for resolving tickets is added to the expedite ticket. For example, any suggestion for resolving the ticket produced by the analytics ticket consolidation block can be added to the expedite ticket. Also, the ticket identification (ID) and ticket work order (WO) information of all other tickets which are in this same consolidation group may be added to the expedite ticket.

At 308, if it is determined that the selected ticket is not a candidate for expedited handling, it is determined at 310 whether the number of low priority tickets in the group is below a defined threshold. The threshold value may be predefined or programmed, for example, based on the best practice for the managed environment, or based on historic observation of a typical number of correlated tickets for typical operation of the managed system. The intent in one embodiment of the present disclosure is to not allow the ticketing system to have an abnormally high number of low priority tickets. An atypically high number of correlated tickets indicates larger problems happening in the system, and requires attention of system administrators.

At 312, in response to determining that the number of low priority tickets is below the threshold, the ticket priority of the non-expedite ticket in this consolidation group is reduced. Otherwise, the logic of the method proceeds to 314. At 314, expedite ticket information might be added to the respective ticket, such as information of the expedite ticket's ID and/or WO for this consolidation group.

At 320, the current ticket is entered into the ticketing system with the updated or added information. This is true for the expedite ticket, as well as for the all tickets in the consolidated group.

Figure 4:
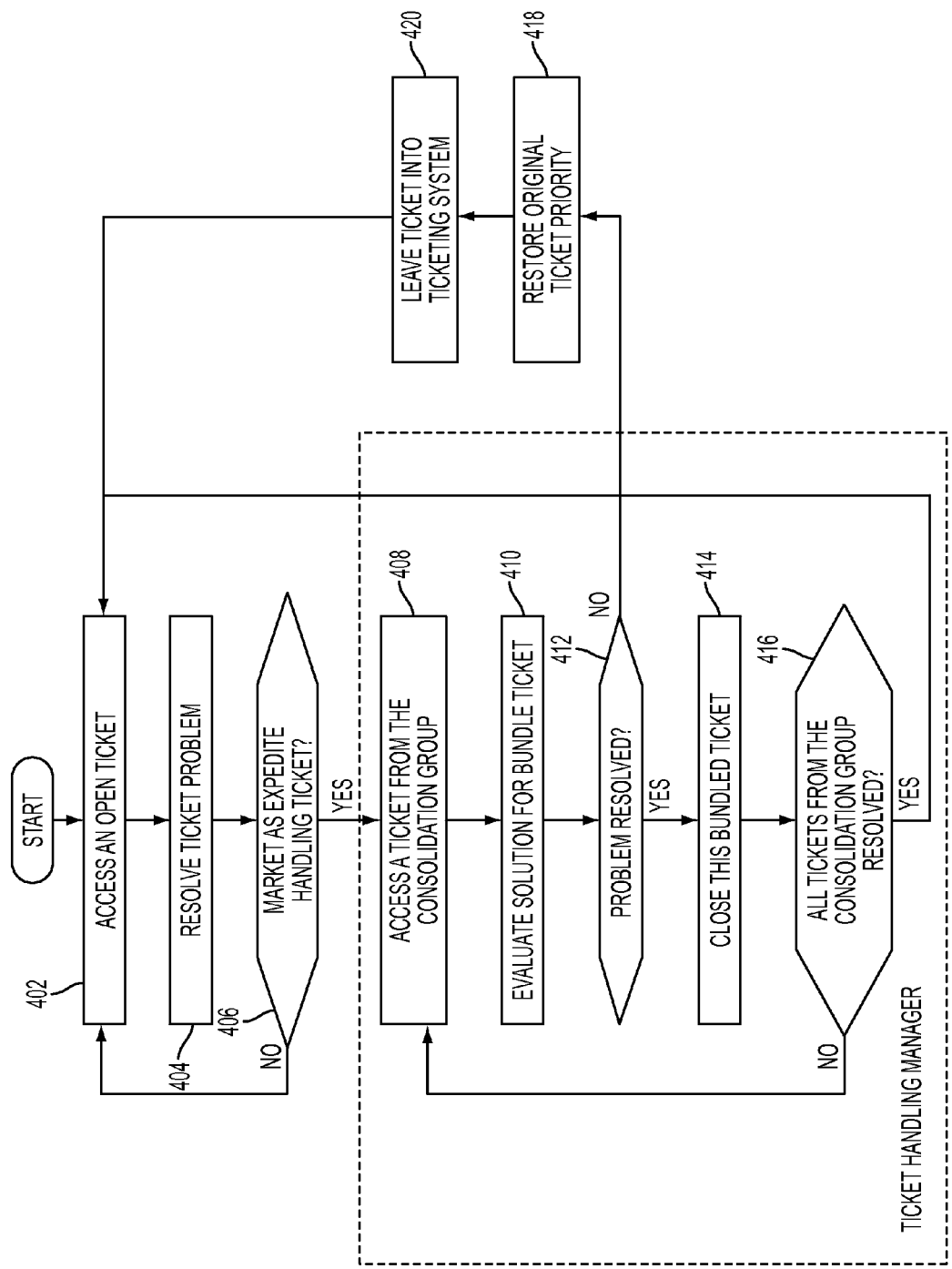
FIG. 4 is a flow diagram illustrating a method of closing of a ticket in one embodiment of the present disclosure.

FIG. 4 is a flow diagram illustrating a method of closing of a ticket in one embodiment of the present disclosure. At 402, an open ticket is accessed from the ticketing system. At 404, the problem associated with the open ticket is resolved. At 406, it is determined whether this resolved ticket is marked as expedite ticket, i.e., one the ticket that has been selected as the representative ticket from a group of consolidated tickets, as shown in FIG. 3. If so, the logic of the method proceeds to 408, otherwise, the logic of the method proceeds to 402.

Once the expedite ticket is resolved, it is checked for all tickets from the same bundle, or consolidation group, to determine if they are also resolved. At 408, a lower priority tickets from the consolidation group is accessed, based on its ID and WO information contained in the expedite ticket.

The determination may be made by manual evaluation and/or automatic evaluation. For example, the representative ticket may be manually evaluated by an administrator to make sure that a solution to this representative ticket or resolving this representative ticket also resolves the bundled ticket or the tickets in the same group. Automatic evaluation may include determining whether there are any duplicate tickets (those that are the same or similar to the representative ticket) in the bundled group. If so, resolving the representative ticket would also resolve the duplicate ticket(s). Automatic evaluation may also include determining whether one or more of the bundled tickets are part of a modeled bundle that has occurred before; for example, based on a priori knowledge or experience that resolving a problem associated with the representative ticket also resolves the problem associated with another ticket in the bundle. Yet another automatic evaluation may include test cases that can be packaged with the ticket bundle. When expedited ticket is resolved, test cases can ensure resolution of bundled tickets.

At 410, a solution is evaluated for the ticket accessed at 408, i.e., one of the tickets in the consolidation or bundled group, also referred to as a bundled ticket. At 412, it is determined whether the solution resolves the problem for the bundled ticket. If so, at 414, the bundled ticket is closed. At 416, it is determined whether all tickets from the consolidation group have been resolved. If not, the logic returns to 408 to access another ticket from the same consolidation group. If all tickets in the consolidation group have been resolved, the logic returns to 402 to process another open ticket in the ticketing system.

If at 412, it is determined that the problem of the bundled ticket is not resolved, the original ticket priority for this ticket is restored at 418, and at 420 the ticket is left in the ticketing system. The logic continues to 402 to process another open ticket in the ticketing system.

In one embodiment of the present disclosure, the ticket handling manager may observe closed WOs and/or ticket IDs. If WO is identified, the linked consolidated tickets may be closed. Yet in another embodiment, a problem ticket sensitivity threshold, which may be programmable, may be employed. For instance, a number of low priority consolidated tickets reaching the number specified by the sensitivity threshold indicates a persistent problem in the system, in which case priority of the marked ticket may be increased.

With the methodology of the present disclosure in one embodiment, fixing the problem once could resolve multiple tickets, for example, those in the same consolidation group. Also, multiple tickets can become irrelevant and could be eliminated. For example, VMs migrated from one server to another may have tickets caused by hardware-related failure on the previous server, which are not relevant any more. However, it might be not acceptable by a system to remove consolidated tickets, e.g., due to system requirements associated with loss of information, because they are needed to needed to guarantee SLA agreements that promise to fix a percentage of problems during a defined amount of time. Consolidated tickets that may have to be left in the ticketing system may be handled in a special way according to a methodology of the present disclosure in one embodiment.

Figure 5:
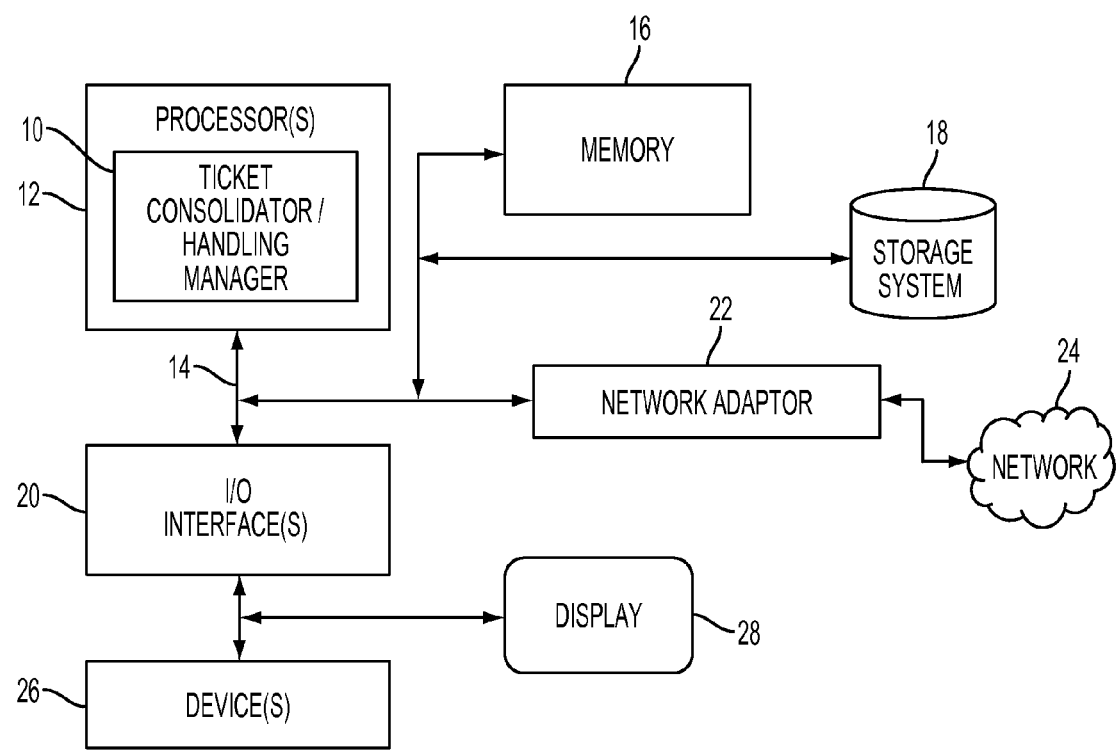
FIG. 5 illustrates a schematic of an example computer or processing system that may implement the ticket handler manager in one embodiment of the present disclosure.

FIG. 5 illustrates a schematic of an example computer or processing system that may implement the ticket handler manager in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a ticket handler manager module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A system for handling problem tickets in a computing environment, comprising:
   a processor;
   a consolidation module operable to execute on the processor and identify a plurality of tickets generated in the computing environment that are candidates for consolidation into a bundled group, the consolidation module further operable to mark the plurality of tickets as bundled; and
   a ticket handling manager module operable to execute on the processor, the ticket handling manager module further operable to select a representative ticket from the bundled plurality of tickets for expedited handling of resolution of the representative ticket based on a criterion, increase a priority associated with the selected representative ticket to higher priority than other tickets in the same bundled group, while decreasing one or more priorities respectively associated with one or more other tickets in the bundled group to lower priority than the increased priority associated with the selected representative ticket, and add information associated with the consolidation to each of the plurality of tickets in the bundled group, the information that is added including at least that said each respective ticket is part of the bundled group.

2. The system of claim 1, further including a ticketing system operable to receive said marked plurality of tickets with the added information.

3. The system of claim 2, wherein the ticket handling manager module is further operable to access a bundled ticket from a group associated with an open ticket that is marked as bundled and whose problem has been resolved, evaluate a solution for the bundled ticket based on the resolution of the open ticket, the ticket handling manager module further operable to, in response to solving a problem associated with the bundled ticket, close the bundled ticket, and in response to determining that the problem associated with the bundled ticket is not solved, restore original priority associated with the bundled ticket and return the bundled ticket to the ticketing system.

4. The system of claim 1, wherein the consolidation module is operable to identify tickets that have the same root cause for consolidation.

5. The system of claim 1, wherein the consolidation module is operable to identify tickets generated from one or more virtual machines running on a same physical machine for consolidation.

6. The system of claim 1, wherein the consolidation module is operable to identify tickets that occur during a same time frame for consolidation.

7. A computer readable storage medium storing a program of instructions executable by a machine to perform a method of handling problem tickets in a computing environment, comprising:

identifying a plurality of tickets generated in the computing environment that are candidates for consolidation into a bundled group;
marking the plurality of tickets as bundled;
selecting a representative ticket from the bundled plurality of tickets for expedited handling of resolution of the representative ticket based on a criterion;
increasing a priority associated with the selected representative ticket to higher priority than other tickets in the same bundled group while decreasing one or more priorities respectively associated with one or more other tickets in the bundled group to lower priority than the increased priority associated with the selected representative ticket;
adding information associated with the consolidation to each of the plurality of tickets in the bundled group, the information that is added including at least that said each respective ticket is part of the bundled group; and
entering the plurality of tickets into a ticketing system with the added information.

8. The computer readable storage medium of claim 7, further including:
accessing an open ticket from the ticketing system;
resolving a problem associated with the open ticket;
determining whether the open ticket is marked as bundled;
in response to determining that the open ticket is marked as bundled:
   accessing a bundled ticket from a group associated with the open ticket;
   evaluating a solution for the bundled ticket;
   in response to solving a problem associated with the bundled ticket, closing the bundled ticket, and in response to determining that the problem associated with the bundled ticket is not solved, restoring original priority associated with the bundled ticket and returning the bundled ticket to the ticketing system.

9. The computer readable storage medium of claim 8, wherein the accessing of the bundled ticket, the evaluating of the bundled ticket, closing of the bundled ticket if the associated problem is solved, and the restoring of the original priority if the associated problem is not solved, are performed for all bundled tickets in the group.

10. The computer readable storage medium of claim 7, wherein the identifying comprises identifying tickets that have the same root cause.

11. The computer readable storage medium of claim 7, wherein the identifying comprises identifying tickets generated from one or more virtual machines running on a same physical machine.

12. The computer readable storage medium of claim 7, wherein the identifying comprises identifying duplicate tickets.

13. The computer readable storage medium of claim 7, wherein the identifying comprises identifying tickets that occur during a same time frame.

14. The computer readable storage medium of claim 7, wherein the selecting a representative ticket comprises randomly selecting the representative ticket.

15. The computer readable storage medium of claim 7, wherein the selecting a representative ticket comprises selecting one that has an earliest creation date among those in the plurality of bundled tickets.

16. The computer readable storage medium of claim 7, wherein the selecting a representative ticket comprises selecting one that has most correlation to those in the plurality of bundled tickets.

17. The computer readable storage medium of claim 7, wherein the decreasing one or more priorities respectively associated with one or more other tickets in the bundled group comprises reducing the priority of said other ticket in the bundled group if a total number of tickets in the computing environment having a defined low priority is below a threshold number.

18. A computer readable storage medium storing a program of instructions executable by a machine to perform a method of handling problem tickets in a computing environment, comprising:
 identifying a plurality of tickets generated in the computing environment that are candidates for consolidation into a bundled group;
 marking the plurality of tickets as bundled;
 selecting a representative ticket from the bundled plurality of tickets for expedited handling of resolution of the representative ticket based on a criterion;
 increasing priority associated with the selected representative ticket to higher priority than other tickets in the same bundled group;
 adding information associated with the consolidation to the representative ticket;
 reducing the priority of one or more of other tickets in the bundled group to lower priority than the increased priority associated with the selected representative ticket if a total number of tickets in the computing environment having a defined low priority is below a threshold number while said increasing of priority associated with the selected representative ticket;
 adding, by the processor, information associated with the representative ticket to the one or more other tickets in the bundled group; and
 entering the plurality of tickets into a ticketing system with the added information.

19. The computer readable storage medium of claim 18, further including:
 accessing an open ticket from the ticketing system;
 resolving a problem associated with the open ticket;
 determining whether the open ticket is marked as bundled;
 in response to determining that the open ticket is marked as bundled:
  accessing a bundled ticket from a group associated with the open ticket;
  evaluating a solution for the bundled ticket based on the resolution of the problem associated with the open ticket;
  in response to solving a problem associated with the bundled ticket, closing the bundled ticket, and in response to determining that the problem associated with the bundled ticket is not solved, restoring original priority associated with the bundled ticket and returning the bundled ticket to the ticketing system.

20. A computer readable storage medium storing a program of instructions executable by a machine to perform a method of handling problem tickets in a computing environment, comprising:
 accessing an open ticket from a ticketing system handling the problem tickets;
 resolving a problem associated with the open ticket;
 determining whether the open ticket is marked as an expedited ticket in a group of bundled tickets;
 in response to determining that the open ticket is marked as an expedited ticket in a group of bundled tickets:
  accessing a bundled ticket from the same group of bundled tickets associated with the open ticket;
  evaluating a solution for the bundled ticket based on the resolution of the problem associated with the open ticket;
  in response to determining that the resolution of the problem associated with the open ticket also solves a problem associated with the bundled ticket, closing the bundled ticket, and in response to determining that the resolution of the problem associated with the open ticket does not solve the problem associated with the bundled ticket, restoring priority of the bundled ticket to its original priority before the bundled ticket's priority was reduced as part of consolidation with the open ticket, and returning the bundled ticket to the ticketing system.

21. The computer readable storage medium of claim 20, wherein the accessing of the bundled ticket, the evaluating of the bundled ticket, closing of the bundled ticket if the associated problem is solved, and the restoring of the original priority if the associated problem is not solved, are performed for all bundled tickets in the group.

* * * * *